United States Patent
Bober et al.

(10) Patent No.: US 10,328,869 B2
(45) Date of Patent: Jun. 25, 2019

(54) INSTALLATION STRUCTURE AND METHOD FOR DECORATIVE BADGING OF VEHICLE INTERIORS

(71) Applicant: Calsonic Kansei North America, Inc., Farmington Hills, MI (US)

(72) Inventors: Brian Bober, Farmington Hills, MI (US); Orv Brow, Farmington Hills, MI (US); Justina Strzelecki, Farmington Hills, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 0 days.

(21) Appl. No.: 15/614,316

(22) Filed: Jun. 5, 2017

(65) Prior Publication Data

US 2018/0345878 A1    Dec. 6, 2018

(51) Int. Cl.
| | |
|---|---|
| *B60R 13/02* | (2006.01) |
| *B60N 2/75* | (2018.01) |
| *B60N 2/58* | (2006.01) |
| *B60N 2/70* | (2006.01) |

(52) U.S. Cl.
CPC ............ *B60R 13/02* (2013.01); *B60N 2/5841* (2013.01); *B60N 2/70* (2013.01); *B60N 2/75* (2018.02); *B60R 13/0206* (2013.01)

(58) Field of Classification Search
CPC ........................................................ B60R 13/02
USPC ............................................................ 428/67
See application file for complete search history.

(56) References Cited

U.S. PATENT DOCUMENTS

| | | | | |
|---|---|---|---|---|
| 1,457,537 A | * | 6/1923 | MacMartin | ............... E01B 3/42 238/286 |
| 7,065,809 B1 | * | 6/2006 | Wesline | ..................... B62J 1/12 24/90.1 |
| 2003/0039526 A1 | * | 2/2003 | Yuan | ..................... B60P 7/0807 410/107 |

FOREIGN PATENT DOCUMENTS

| | | |
|---|---|---|
| JP | 1-151800 | 10/1989 |
| JP | 2004352203 | 12/2004 |

* cited by examiner

*Primary Examiner* — Brent T O'Hern
(74) *Attorney, Agent, or Firm* — Foley & Lardner LLP

(57) ABSTRACT

An attachment structure is configured to be installed in a vehicle interior. The attachment structure includes an outer skin and an ornament embedded in the outer skin. The attachment structure further includes a plate which provided on an underside of the outer skin. The outer skin is disposed between the ornament and the plate. The attachment structure also includes a base positioned at an underside side of the plate and configured to be coupled to the plate, and a cushion. The cushion may be positioned between the outer skin and the plate, or between the plate and the base.

13 Claims, 15 Drawing Sheets

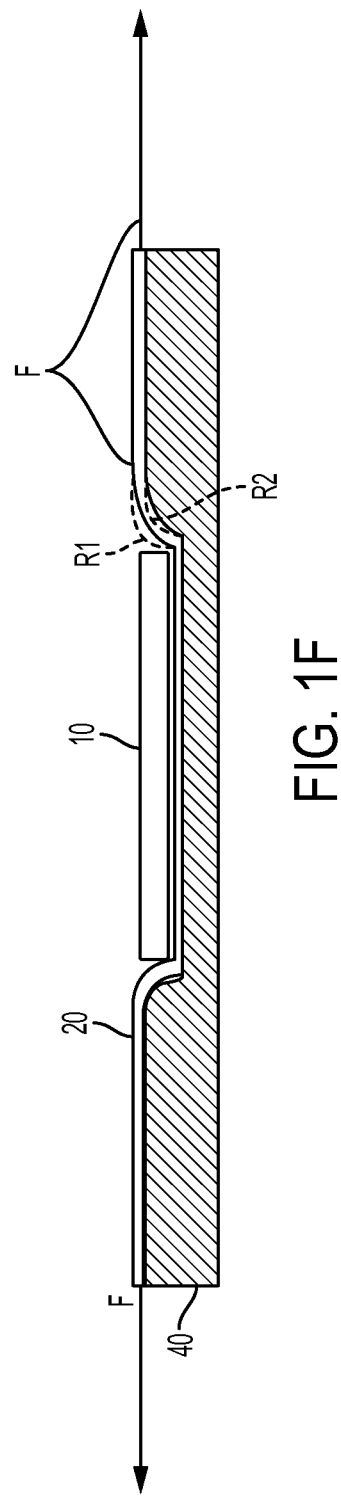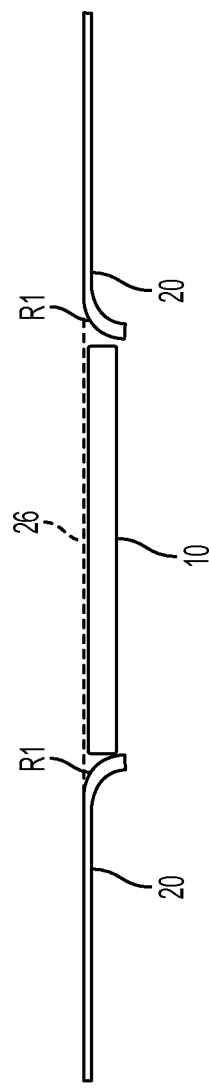
FIG. 1F
FIG. 1G

US 10,328,869 B2

INSTALLATION STRUCTURE AND METHOD FOR DECORATIVE BADGING OF VEHICLE INTERIORS

FIELD OF THE DISCLOSURE

The present application relates generally to decorative badging of vehicle interiors. More specifically, the present application relates to structures and methods for installing decorative badging in vehicle interiors.

BACKGROUND

Vehicle interiors include soft material (e.g., vinyl or leather) which is exposed to and visible by vehicle occupants. For example, a vehicle console in a vehicle interior may include a lid having a decorative badge which is embedded in the lid. The decorative badge may be, for example, a representation of a manufacturer logo or an emblem displaying particular vehicle model information.

Such a decorative badge may be embedded in the soft material of the interior in a way that causes the soft material to wrinkle or pucker around the edges of the decorative badge. The material of the vehicle interior may become distorted with respect to the contours of the decorative badge. These phenomena may degrade the intended aesthetic impression of the decorative badge and the soft material surrounding the badge.

SUMMARY

The present disclosure sets forth structures and methods for enhanced installation of decorative badges in vehicle interiors. In various exemplary embodiments, for example, an ornament in the form of a decorative badge may be embedded in a console lid, without the material of the console lid wrinkling or puckering. In particular, in such embodiments, an interface of the vehicle interior material and the decorative badge retains their appearance, and the badge is installed so as to protect against wrinkling, puckering and other distortions. A styling radius between the decorative badge and the surrounding material is maintained to avoid "washing out" which impairs the definition or differentiation between the decorative badge and the surrounding material. A crisp definition or differentiation between the decorative badge and the surrounding material may be preserved even if the shape of the badge is complex (e.g., with one or more asymmetrical aspects) and/or includes a combination of rectilinear and curvilinear elements, for example. These and other advantageous features will become apparent to those reviewing the present disclosure, and all such advantages are intended to fall within the scope of the present disclosure.

One embodiment of the present disclosure relates to an attachment structure configured to be installed in a vehicle interior. The attachment structure includes an outer skin and an ornament embedded in the outer skin. The attachment structure further includes a plate which provided on an underside of the outer skin. The outer skin is disposed between the ornament and the plate. The attachment structure also includes a base positioned at an underside side of the plate and configured to be coupled to the plate, and a cushion. The cushion may be positioned between the outer skin and the plate, or between the plate and the base.

Another embodiment of the present disclosure relates to a method of manufacturing a portion of a vehicle console. The method includes mounting an ornament to a skin material to form a skin assembly; disposing the skin assembly over a foam insert; covering a base beneath the foam insert with the skin assembly; securing a backing to an underside of the outer skin and disposing the backing between the ornament and the base; and positioning the foam insert between the plate and the base.

A further embodiment of the present disclosure relates to an installation. The installation comprises an upper skin layer; an ornament positioned in an upper surface of the upper skin layer; and a lower layer configured to be coupled to a rear side of the upper skin layer. The lower layer comprises a base disposed parallel to the ornament; a plurality of projections extending from the base toward the upper surface of the upper skin layer, and a cushion disposed between the ornament and the lower layer, wherein the plurality of projections are configured to penetrate the cushion.

BRIEF DESCRIPTION OF THE DRAWINGS

The details of one or more embodiments are set forth in the accompanying drawings and the description below. Other features, aspects, and advantages of the disclosure will become apparent from the description, the drawings, and the claims.

FIG. 1F is a partial cross-section of a portion of a vehicle console, according to the first exemplary embodiment.

FIG. 1G is a partial cross-section of a portion of a vehicle console, according to the first exemplary embodiment.

Figure 1A:
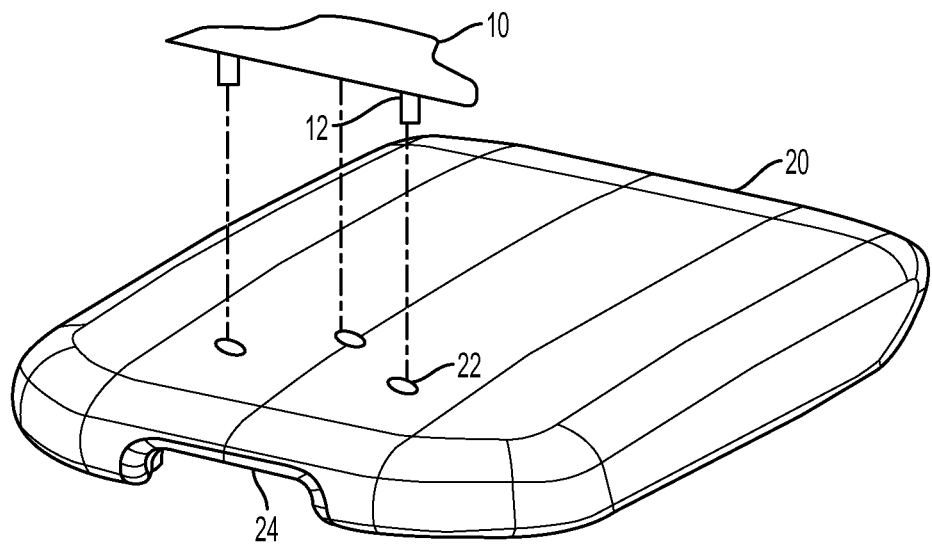
FIG. 1A is a perspective view of a portion of a vehicle console including a decorative badge, according to a first exemplary embodiment.

Some or all of the figures are schematic representations for purposes of illustration. The figures are provided for the purpose of illustrating one or more embodiments, without limiting the scope or the meaning of the claims.

DETAILED DESCRIPTION

In the description that follows, structures and features that are the same or similar as shown in various views of the drawings may be denoted by the same reference numerals throughout the several views for consistency and simplicity, but it should be appreciated that various structures or features may differ.

FIG. 1A is a perspective view of a portion of a vehicle console including a decorative badge, according to a first exemplary embodiment. Specifically, FIG. 1A depicts a front-right perspective view of an upper portion 20 of a lid of a vehicle console. The upper portion 20 includes a concave portion 24 in an approximate center location of the upper portion 20, i.e., at a front end of the upper portion and at an approximate midpoint in a horizontal direction of the upper portion 20. The concave portion 24 may be formed as an indentation which a vehicle occupant (e.g., a passenger) may readily manipulate so as to lift or depress the lid of the vehicle console. In this manner, the vehicle occupant may access one or more interior compartments within the console. In some embodiments, the console may be provided in an arm rest, e.g., as a central console between seats. The vehicle console, including the lid and upper portion 20 of the lid, may be made of one or more materials suitable for upholstery in vehicle interiors, including but not limited to thermoplastic urethane ("TPU"), nylon, polyester, vinyl, faux leather or leather, or any combination thereof.

The upper portion 20 includes at least one aperture 22. For example, as shown in FIG. 1A, the upper portion 20 includes two apertures 22 at a first distance from a front end of the upper portion 20 and a third aperture at a second distance from the front end of the upper portion 20. The third aperture 22 is located in a horizontal direction between the first and second apertures 22, but is offset so as to be farther away from a gripping portion of the lid (i.e., the portion that a vehicle occupant would manipulate to open the console lid) than the first and second apertures. While the apertures 22 shown in FIG. 1A are circular and of approximately equivalent size, it should be appreciated that the apertures 22 may vary in shape, size and location.

An ornament in the form of a decorative badge 10 is positioned above the upper portion 20, proximate to or on the concave portion 24. The decorative badge 10 may be an escutcheon formed as a vehicle maker logo, a brand name, a vehicle model, a string of alphanumeric text, a symbol, or any combination thereof. The decorative badge 10 is an emblem intended to convey a distinct visual impression. As such, the decorative badge 10 is provided so as to stand out clearly from the surrounding interior material, with a crisp definition therefrom, as discussed in more detail below. The badge 10 may be made of one or more materials including hard plastic, metal, or combinations thereof. The material of the badge 10 may be harder than the material used for the vehicle interior (i.e., the inner and/or outer material of the console). For example, the badge 10 may be made of a hard plastic such as polyethylene, polyvinyl chloride, polypropylene and/or polystyrene. Such plastic may be rigid and harder than a soft material used for the vehicle interior, such as TPU.

The decorative badge 10 is provided with at least one guide 12 which is configured to serve as at least one of a fastener or a locating mechanism for respectively securing and positioning the guide 12 in place. As shown in FIG. 1A, two guides 12 are positioned at an underside of the badge 10 so as to align with the two apertures 22 positioned at the first distance from the front end of the upper portion 20. A third guide 12 (not shown) which is between the two guides 12 in a horizontal direction may be positioned at an underside of the badge 10 so as to align with the third aperture 22 at the second distance from the front end of the upper portion 20.

While the embodiment shown in FIG. 1A includes three apertures 22 in the upper portion 20 so as to align with three guides 12, it should be understood that the number of apertures 22 and guides 12 may vary. For example, the number of apertures 22 and corresponding guides 12 may vary in accordance with a profile of the badge 10, such that a badge with a complex profile (e.g., polygonal and/or asymmetric) or a larger surface area may be provided with a greater number of guides 12 than is shown in FIG. 1A, so as to communicate with a correspondingly greater number of apertures. Conversely, a comparatively less complex badge (e.g., a quadrilateral) may be provided with a smaller number of guides so as to communicate with correspondingly fewer apertures.

The decorative badge 10 may be positioned approximately flush with the surrounding material of the upper portion 20. The decorative badge 10, in some implementations, may be positioned "sub-flush" with the surrounding material, i.e., at a slight offset, so as to be disposed just beneath the surrounding material (e.g., ±0.1 mm, ±0.2 mm, ±0.5 mm, ±1 mm, ±2 mm, or ±5 mm from an imaginary straight line connecting top surfaces of the surrounding material on left and right sides of the badge 10). As the decorative badge 10 is positioned either flush or sub-flush with respect to the surrounding material of the upper portion 20, the decorative badge 10 should appear distinct and separate from the surrounding material so that it stands out and is readily visible. The visual effect of the badge 10 appearing distinct and separate from the surrounding material (i.e., with a crisp definition therefrom) may be achieved at least in part by ensuring that a styling radius between the badge 10 and the surrounding material is preserved. The styling radius is a fillet radius between the lower surface of the badge 10 and an upper surface of the soft material of the upper portion 20 of the vehicle console lid. The styling radius may be maintained within a desired tolerance. For example, the styling radius may be maintained within a tolerance of ±0.1 mm, ±0.2 mm, ±0.5 mm, ±1 mm, ±2 mm, or ±5 mm, according to certain embodiments.

Figure 1B:
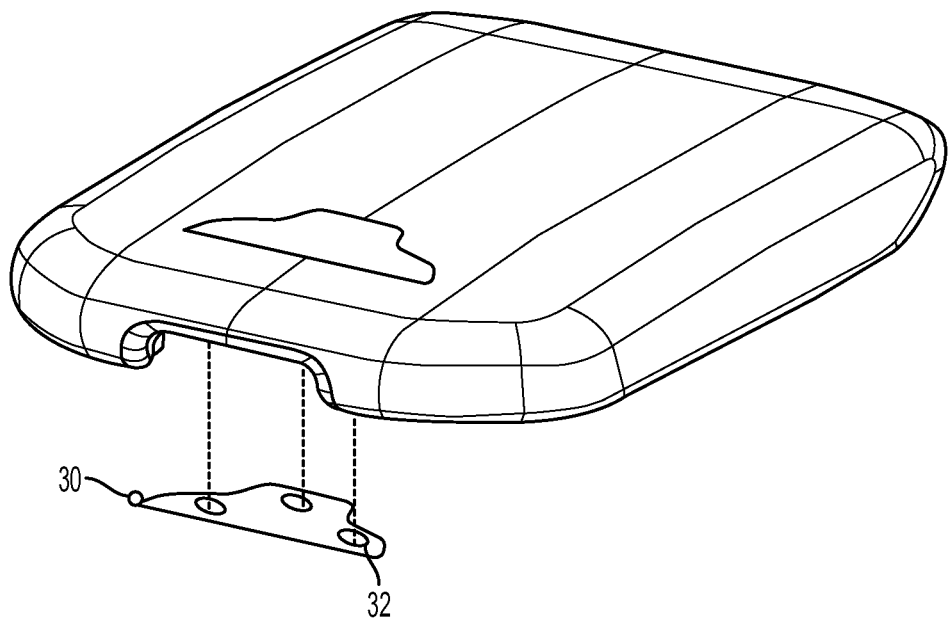
FIG. 1B is a perspective view of a portion of a vehicle console including a back plate, according to the first exemplary embodiment.

FIG. 1B is a perspective view of a portion of a vehicle console provided with a back plate 30 according to an exemplary embodiment. The back plate 30 is a rigid member which may be disposed so as to directly contact the upper portion 20 of the vehicle console lid. Specifically, the back plate 30 may directly contact an underside (rear side) of the upper portion 20, at a lower surface thereof. In contrast, the badge 10 contacts at least an upper (topmost) surface of the upper portion 20. Further, the back plate 30 is shaped so as to conform to the shape of the decorative badge 10 in the embodiment shown in FIG. 1B. However, the back plate 30 need not have a similar or identical shape to that of the badge 10. In some embodiments, the back plate 30 may be provided as a ring, for example, that does not conform to the badge 10.

Additionally, as with the upper portion 20 of the vehicle console lid, the back plate 30 includes one or more apertures 32. The apertures 32 may be formed in the back plate 30 so as to align with corresponding apertures 22 of the upper portion 20 of the console lid, and to align in turn with the guides 12 of the badge 10. Further, while FIG. 1B depicts three apertures 32, it should be understood that the number and location of apertures 32 may vary in accordance with the shape and size of the badge 10 and/or the shape and size of the back plate 30. The back plate 30 is provided as a hard substrate beneath the interior material of the upper portion 20 of the console. As shown in FIG. 1B, the upper portion 20 is sandwiched between the back plate 30 on an underside of the upper portion 20 and the decorative badge 10 on a top side of the upper portion 20.

Figure 1C:
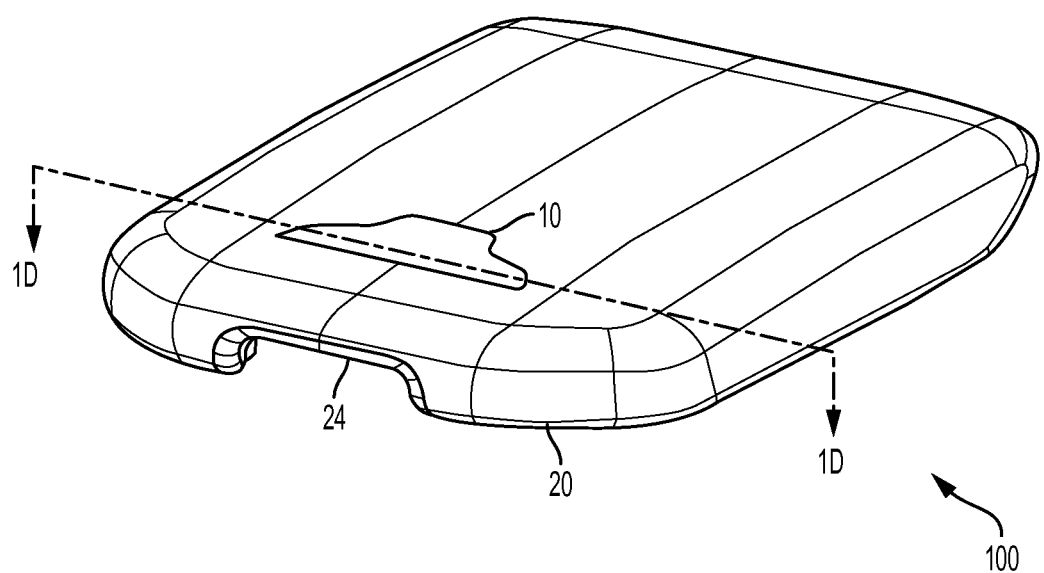
FIG. 1C depicts perspective views of portions of a vehicle console, according to an exemplary embodiment.
Figure 1D:
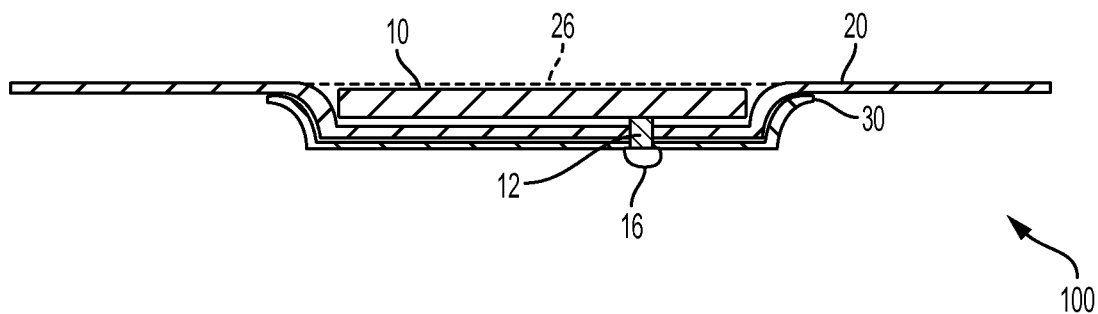
FIG. 1D is a partial cross-section of a portion of a vehicle console, according to the first exemplary embodiment.

FIG. 1C is a perspective view of a portion of a vehicle console including an attachment structure 100 having the badge 10 positioned on the upper portion 20. FIG. 1D is a partial cross-section of a portion of a vehicle console taken along line A-A of FIG. 1C. As shown in FIG. 1D, the attachment structure 100 includes the badge 10 which is positioned so as to be flush or sub-flush relative to an upper surface 26 of the soft material of the upper portion 20 of the console lid. In particular, dashed lines above the badge 10 correspond to a height of the upper surface 26 if extended to cover the badge 10 (that is, if no concave portion 24 were provided). The soft material is positioned between the badge 10 and the back plate 30. The guide 12 provided with the badge 10 is communicated with the back plate 30 and may be fixed to at least one of the badge 10 and the back plate 30. As shown in FIG. 1D, the guide 12 extends from an underside of the badge 10 through the soft material and the back plate 30. The guide 12 serves to locate the badge 10 with respect to the upper portion 20.

Further, the guide 12 may be provided with an attachment member 16. The attachment member 16 may be a plastic stud protruding from the guide 12 and configured to fit into an aperture in the back plate 30. In some embodiments, the guide 12 and attachment member 16 may be formed as a heat stake (i.e., a thermoplastic stake). The attachment member 16 is deformable through softening of the plastic under application of heat to form a head which mechanically locks the badge 10 and back plate 30 together by creating an interference fit. The guide 12 secures the badge 10, which may be front-mounted through the soft material of upper portion 20, to the upper portion 20. In turn, the back plate 30 may be joined to the assembly of the badge 10 and upper portion 20 from an underside (a rear side) of the upper portion 20 using the guide 12. By providing the guide 12 and attachment member 16 as a heat stake, a solid connection or attachment may be formed from the badge 10 to the back plate 30, without excess components such as rivets and without additional processing steps such as welding or soldering. The badge 10, upper portion 20 and back plate 30 may thus be provided in a layered arrangement with a secure connection therebetween, such that the badge 10, upper portion 20 and back plate 30 are fixed to each other.

In various embodiments, the attachment member 16 may be a screw attachment or nut, and the guide 12 may be configured as a rod, bolt or boss configured to be coupled with the attachment member 16. For example, the guide 12 may be a bolt which is configured to be threadably coupled with the attachment member 16. While the partial cross-section in FIG. 1D depicts one such combination of a guide 12 and attachment member 16, it should be understood that the number of guides and attachment members may correspond to the number of apertures 22, 32 in the upper portion 20 of the console lid and the back plate 30, respectively.

Figure 1E:
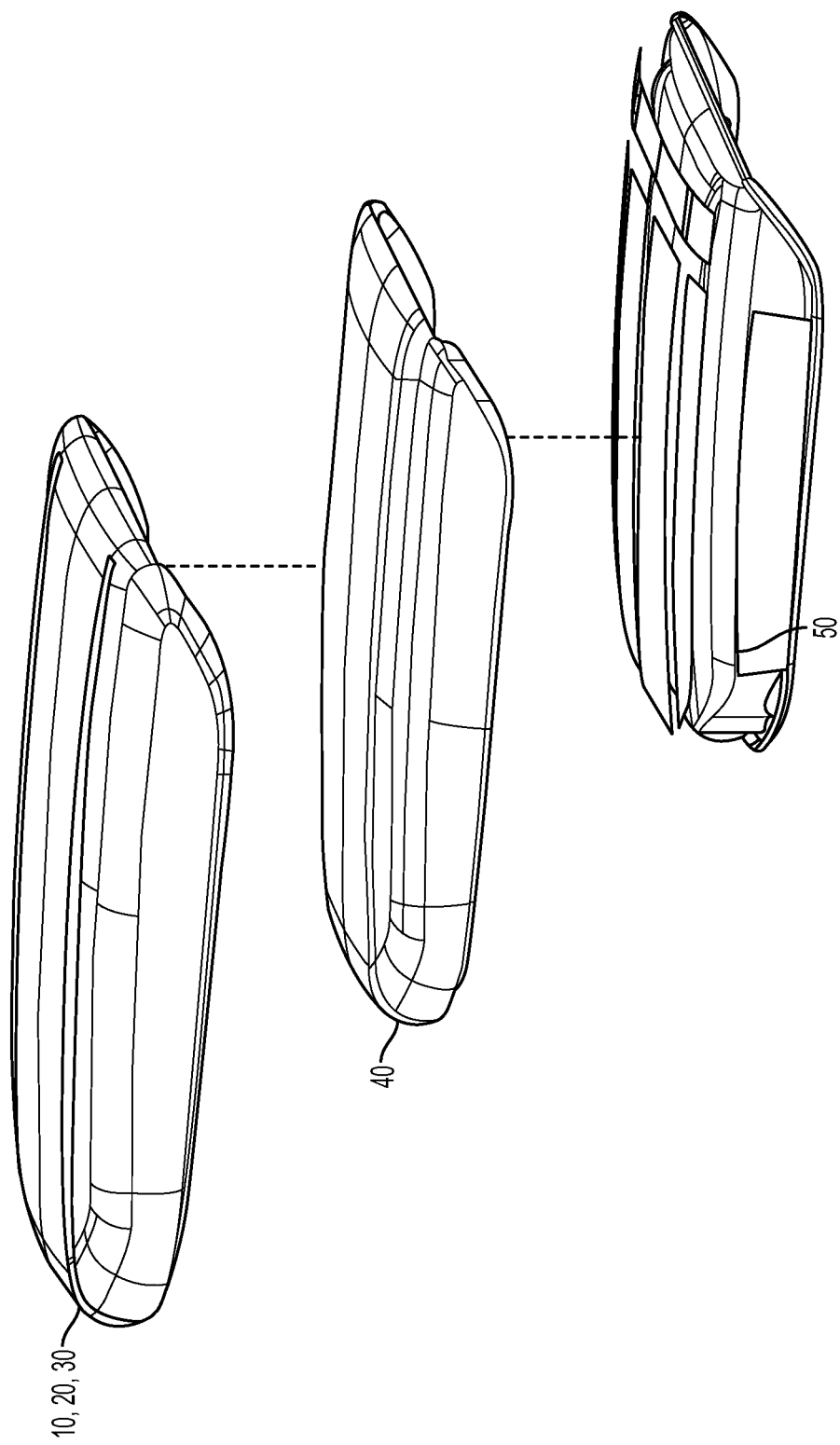
FIG. 1E is a right-side perspective view of a portion of a vehicle console, according to the first exemplary embodiment.

FIG. 1E depicts right-side perspective views of portions of a vehicle console, according to the first exemplary embodiment. In particular, first, second and third perspective views of portions of the vehicle console at different stages of assembly are shown in the respective upper, middle and lower thirds of FIG. 1E. In the first perspective view, a sub-assembly of the upper portion 20 is shown. This sub-assembly includes the decorative badge 10, the upper portion 20, and the back plate 30 assembled together, as shown in FIG. 1D. The assembly of the badge 10, upper portion 20 and back plate 30 forms an 'outer skin' or a 'skin assembly' which is an outer layer (an upper skin layer) placed over the foam insert 40.

The second perspective view of FIG. 1E depicts the sub-assembly of badge 10, upper portion 20 and back plate 30 as further assembled with a foam insert 40. Finally, the third perspective view depicts the sub-assembly of the badge 10, upper portion 20, back plate 30 and foam insert 40 with a lid inner portion 50 (which may also be referred to herein as a "lid inner"), collectively forming the attachment structure 100. The lid inner portion 50 forms a base to which the back plate 30 may be coupled. The skin assembly of the badge 10, upper portion 20 and back plate 30 is wrapped over the foam insert 40 and in turn attached to the lid inner portion 50, so as to be fixed to the lid inner portion 50.

FIG. 1F is a partial cross-section of a portion of a vehicle console including the foam insert 40 mentioned above. Specifically, FIG. 1F is a partial cross-section taken along line A-A of FIG. 1C showing attachment structure 100. As shown in FIG. 1F, the foam insert 40 is positioned underneath the badge 10. The foam insert may be provided as a bun or cushion on which the soft material of the upper portion 20 is wrapped. The foam insert 40 may be formed as a rectangular block or sheet which is compressible so as to conform to a profile of the upper portion 20. For example, the foam insert 40 may include end portions which are at a first height, and a middle portion between the end portions which is at a second height that is lower than the first height, thereby conforming to the concave portion 24 of upper portion 20.

The attachment structure 100 may be provided as a lid of a console for installation in a vehicle interior, as mentioned above. During creation of the lid of the vehicle console, including upper portion 20, the soft outer material of the lid is pulled during a wrapping process. Specifically, the material is wrapped around a structure (such as a lid inner portion) to form the upper portion 20. During this process, the wrapping may distort or "wash out" the interface between the badge 10 and the surrounding material, impairing the crispness of separation and the clear definition between the badge 10 and the surrounding material. The washing out may cause the styling radius to widen or otherwise be altered so as to exceed a desired tolerance, which may affect the appearance and/or structural position of the badge 10. For example, if the badge 10 initially appeared precisely flush or sub-flush with the surrounding material, while nevertheless appearing distinct from the surrounding material, the wrapping may alter the physical relationship between the badge 10 and the surrounding material, e.g., by causing the material to be offset from an initial position.

In particular, by wrapping the soft material of the upper portion 20 to be taut over the foam insert 40, ensuing forces on the material may affect the badge-material interface. The badge-material interface may be affected in a way that makes it difficult to visually distinguish between edges of the soft material and edges of the badge 10 (i.e., where each of the surrounding material and the badge begins and ends). In certain exemplary embodiments, components such as the back plate 30 and/or a foam insert, as described in more detail below, are used to alleviate "washing out" of the badge-soft material interface and to preserve the definition between the badge 10 and the surrounding material of the upper portion 20.

A force F is exerted on the soft material in order to wrap the material around the foam insert 40 and to attach it to the lid inner portion 50. The force F exerted in wrapping the soft material causes the foam insert 40 to compress, and may therefore lead to the "washing out" of the styling radius described above. In particular, as shown in FIG. 1F, the styling radius R1 shown in dashed lines may be "washed out" from an initial position, so as to have a second effective styling radius R2 shown in solid lines. That is, the noted wrapping forces may lead to deformation of the badge-soft material interface such that the intended radius R1 may only be maintained briefly, if at all, with the final production construction having a wider radius R2.

However, in certain exemplary embodiments, the decorative badge 10 is installed in the console lid with the foam insert 40 so as to avoid "washing out" and to maintain a configuration as shown in FIG. 1G. FIG. 1G is a partial cross-section of a portion of a vehicle console lid. As shown in FIG. 1G, the decorative badge 10 is kept in a sub-flush or flush arrangement with respect to an upper surface 26 of upper portion 20. The soft material of the upper portion 20 has styling radius R1 at left and right sides of the decorative badge 10. By maintaining the styling radius R1 at both of the left and right sides of the badge 10, while keeping the badge 10 in sub-flush or flush position relative to the upper surface 26, the crispness of definition of the badge-soft material interface may be preserved. Thus, the visual and physical effects of separation of the badge and soft material may be maintained even if the badge 10 is formed as a complex shape, a shape with one or more asymmetrical aspects, and/or a shape with a plurality of corners (e.g., a 'T' shape or a combination of curvilinear and rectilinear elements).

Figure 1H:
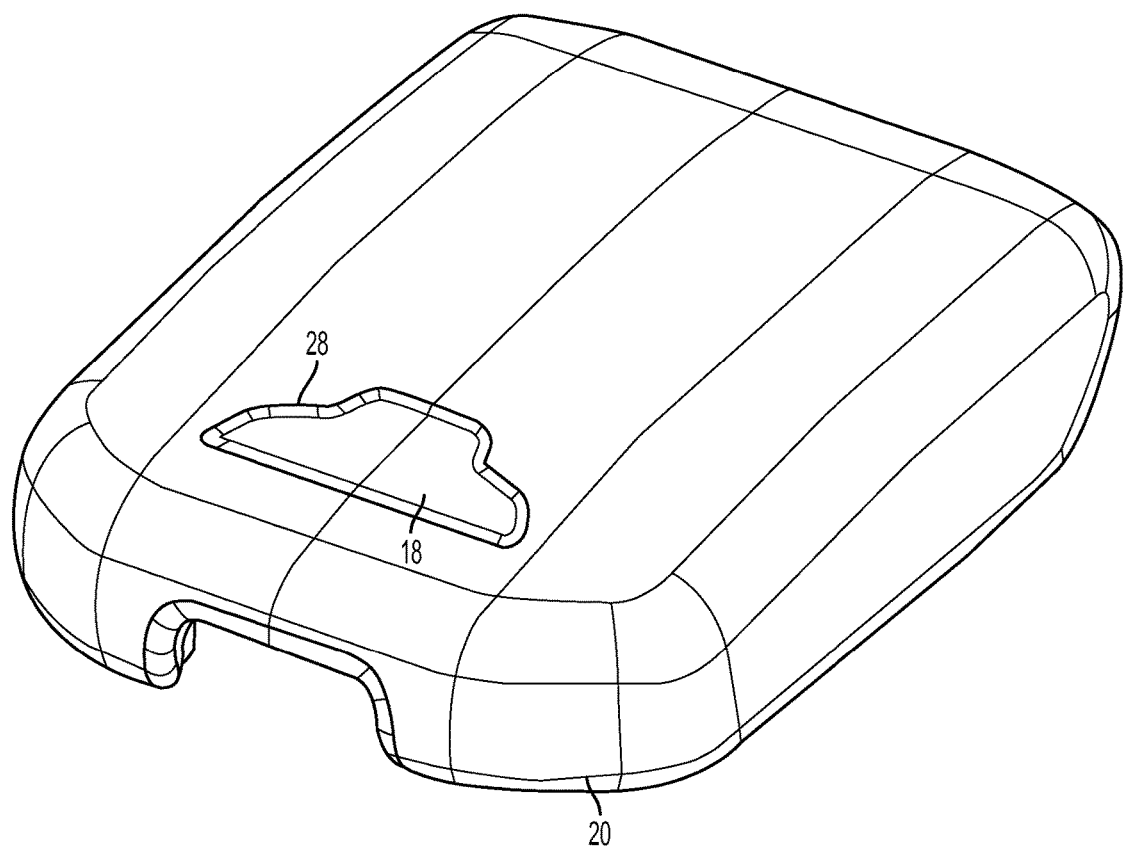
FIG. 1H is a perspective view of an assembled console lid, according to an exemplary embodiment.

FIG. 1H is a perspective view of an assembled vehicle console lid, showing the decorative badge 10 embedded in the upper portion 20. The vehicle console lid as assembled includes the decorative badge 10 in the upper portion 20, provided with the back plate 30 and the foam insert 40 and lid inner 50 (the back plate 30, insert 40 and inner 50 are not shown). The console lid as assembled as described above allows for the badge 10 to appear distinct from the surrounding material of the upper portion 20. As shown in FIG. 1H, a perimeter 18 of the badge 10 is visible and defined with respect to a perimeter 28 of the soft material of upper portion 20 surrounding the perimeter 18. In particular, the combination of the back plate 30 and foam insert 40 contributes to preserving the definition of the badge 10 even after the soft material is wrapped and pulled so as to be taut over the lid inner portion 50.

Figure 2A:
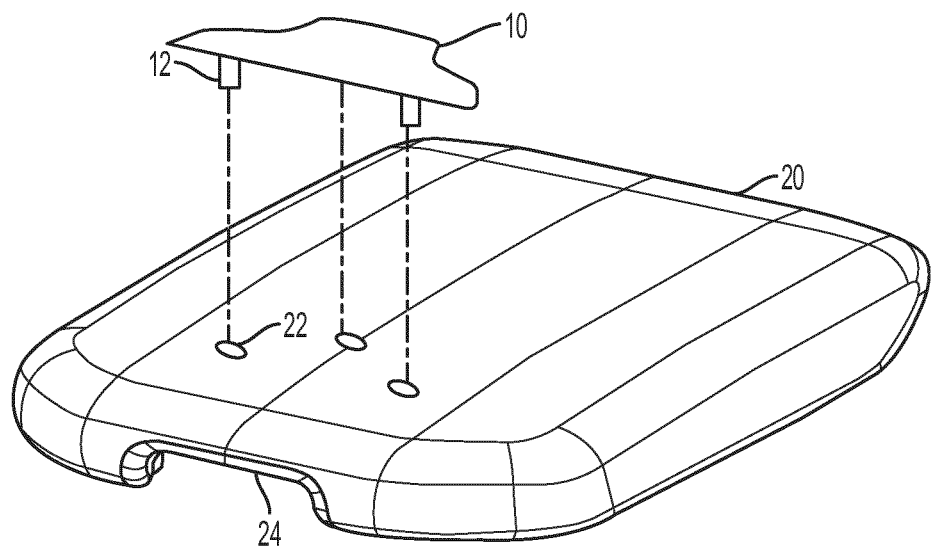
FIG. 2A is a perspective view of a portion of a vehicle console including a decorative badge, according to a second exemplary embodiment.
Figure 2B:
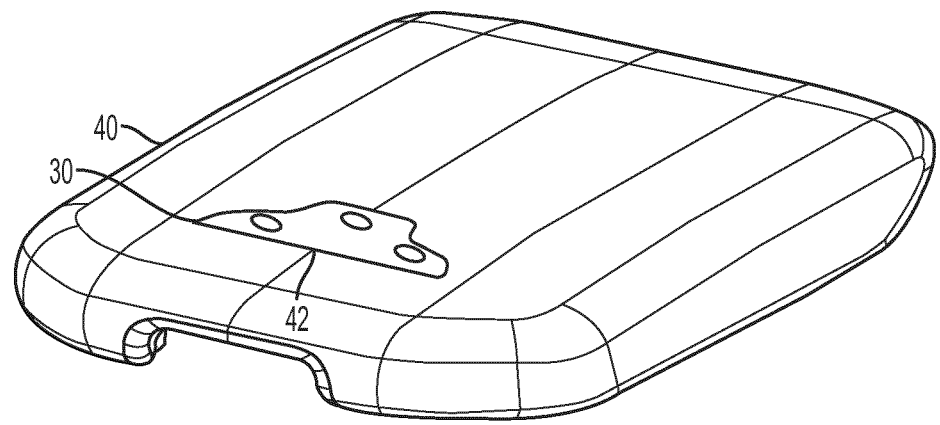
FIG. 2B is a perspective view of a portion of a vehicle console including a back plate, according to the second exemplary embodiment.

FIG. 2A is a perspective view of a portion of a vehicle console including a decorative badge, according to a second exemplary embodiment. In the second embodiment, the badge 10 and upper portion 20 are assembled as described above with respect to the first embodiment. That is, the badge 10 is front mounted through the material of the upper portion 20 via guides 12. FIG. 2B is a perspective view of a portion of a vehicle console including a back plate, according to the second exemplary embodiment. In contrast to the first embodiment, the back plate 30 is not assembled from an underside (a rear side) of the upper portion 20 so as to contact the underside. Rather, the back plate 30 is set into a recess 42 in the foam insert 40. In some embodiments, the recess 42 of the foam insert 40 may be provided so as to conform in profile to the badge 10. On either side of the recess 42, the foam insert may include arched portions extending upward which exceed a height of the recess 42, so as to abut against an uppermost portion of the material of the upper portion 20 other than the concave portion 24. Further, in some embodiments, the recess may be provided as a cut-out, such as a rectangular cut-out in the foam, which assumes a shape of the badge 10 owing to compressive forces exerted by the badge 10 on the insert 40.

Figure 2C:
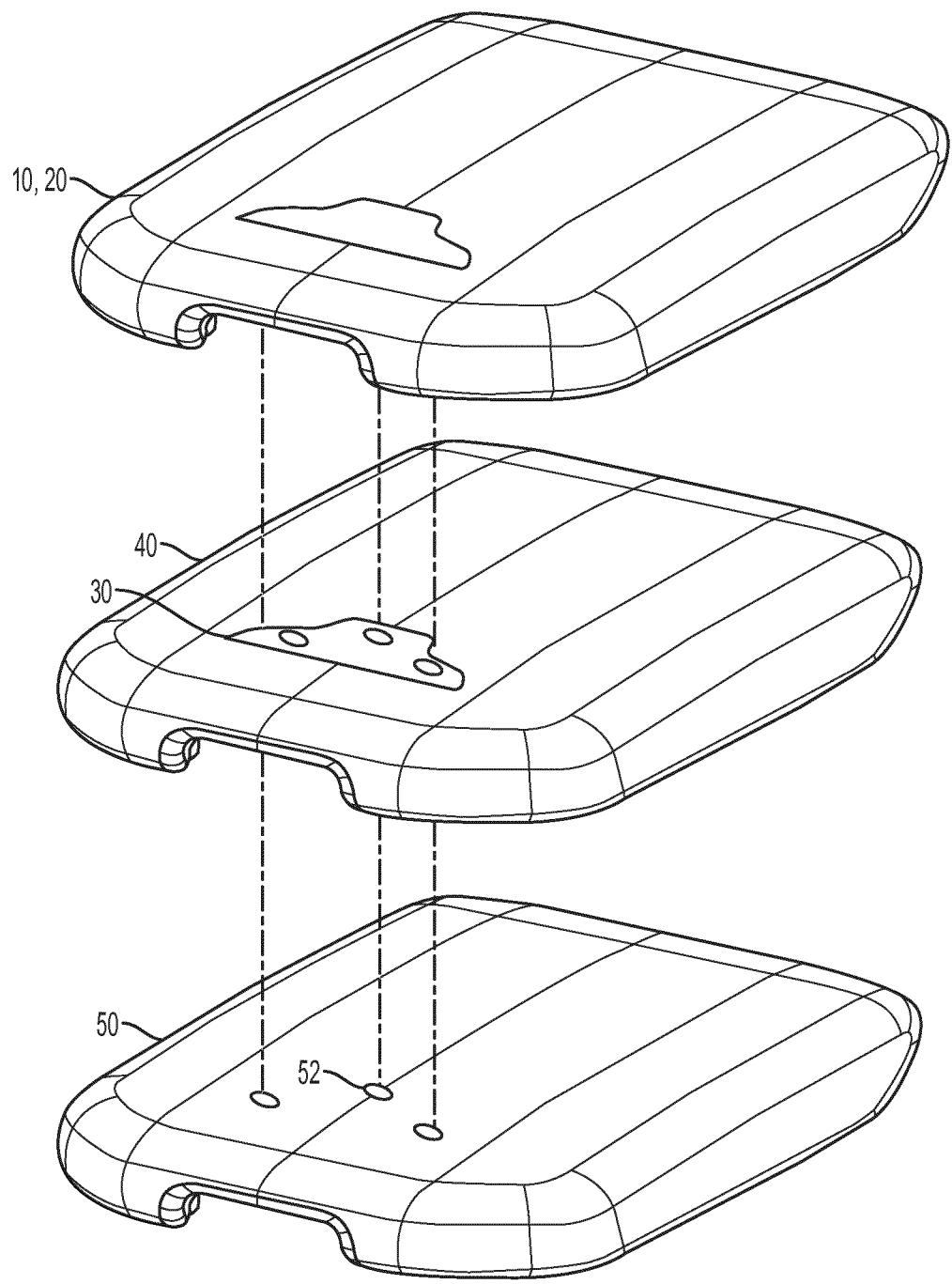
FIG. 2C is a perspective view of portions of a vehicle console, according to the second exemplary embodiment.

FIG. 2C is a perspective view of portions of a vehicle console, according to the second exemplary embodiment. More particularly, FIG. 2C depicts three perspective views of portions of a vehicle console lid, including an upper view, a middle view and a bottom view, with dashed lines indicating an exemplary and non-limiting order of assembly. Specifically, the upper view depicts the badge 10 assembled with the upper portion 20 as shown in FIG. 2A. The middle view depicts the foam insert 40 provided with the back plate 30 set in the recess 42 therein, as shown in FIG. 2C. The lower view depicts the lid inner portion 50. As indicated by the dashed lines, the assembled badge 10 and upper portion 10 are placed over the assembly of the foam insert 40 and back plate 30 and over the lid inner portion 50. As seen in the lower view, the lid inner portion 50 includes a plurality of apertures 52 configured to communicate with the guides 12 (not shown).

Figure 2D:
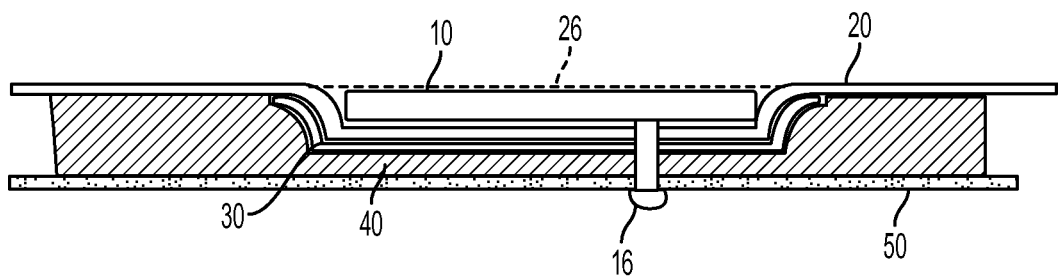
FIG. 2D is a partial cross-section of a portion of a vehicle console, according to the second exemplary embodiment.

FIG. 2D is a partial cross-section of a portion of a vehicle console, taken along line A-A as shown in FIG. 1C. As shown in FIG. 2D, the guide 12 and attachment member 16 extend through the back plate 30, the foam insert 40 and the lid inner portion 50, which serves as a base of the attachment structure 100. In this manner, a layered arrangement of an attachment structure may be formed with the badge 10, the upper portion 20, the back plate 30, foam insert 40 and lid inner portion 50 securely fixed to each other. Moreover, a fillet radius of each of the material of the upper portion 20, the back plate 30 and the foam insert 40 may be substantially similar or equivalent to each other, such that the contours of the material, the plate 30 and the foam insert 40 attain a comparable profile. Further, as with the first embodiment, the guide 12 and attachment member 16 may be provided so as to form a solid connection mechanism such as a heat stake or a screw attachment. Thus, the layered arrangement shown in FIG. 2D provides a stable attachment structure for installation in a vehicle interior.

Figure 3A:
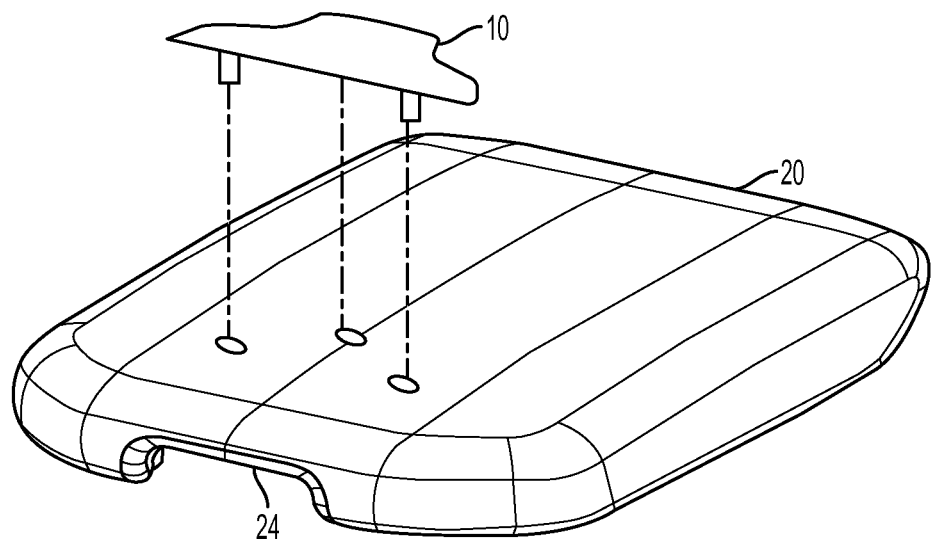
FIG. 3A is a perspective view of a portion of a vehicle console including a decorative badge, according to a third exemplary embodiment.

FIG. 3A is a perspective view of a portion of a vehicle console including a decorative badge, according to a third exemplary embodiment. The badge 10 and upper portion 20 of the soft material of the console lid may be structured and assembled in a similar or identical manner as described above with respect to the first and second exemplary embodiments. In particular, the badge 10 may be front mounted through the upper portion 20 via guides 12. The guides 12 may engage with the badge 10 and upper portion 20 without directly coupling the badge 10 to the lid inner portion 50. The badge 10 and upper portion 20 form a 'skin assembly' of an outer or upper skin layer which, when assembled with additional components as discussed below, forms at least an outer portion of the console lid.

Figure 3B:
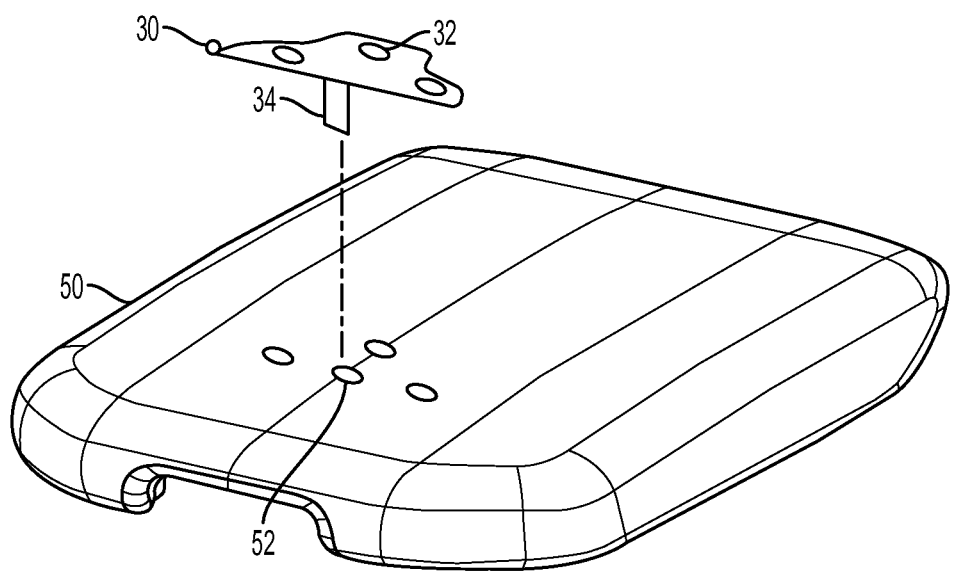
FIG. 3B is a perspective view of a portion of a vehicle console including a back plate, according to the third exemplary embodiment.

FIG. 3B is a perspective view of a portion of a vehicle console including the back plate 30, according to the third exemplary embodiment. In contrast to the first and second embodiments, in the third embodiment, the back plate 30 is not positioned via an underside (a rear side) of the upper portion 20 or set in a recess of the foam insert 40. Rather, the back plate 30 is front loaded (mounted) onto the lid inner portion 50. Further, the back plate 30 is provided with at least one guide 34 which are configured to communicate with apertures 52 of the lid inner portion 50, so as to aid in locating and positioning the back plate 30 on the lid inner portion 50. In particular, the at least one guide 12 protruding downward from badge 10 is communicated with the upper portion 20 and lid inner portion 50 through at least one opening provided in the upper portion 20 and lid inner portion 50, while the guide 34 protruding downward from the back plate (backing) 30 is communicated through a corresponding opening 52 of lid inner portion 50, so as to be received by opening 52.

Figure 3C:
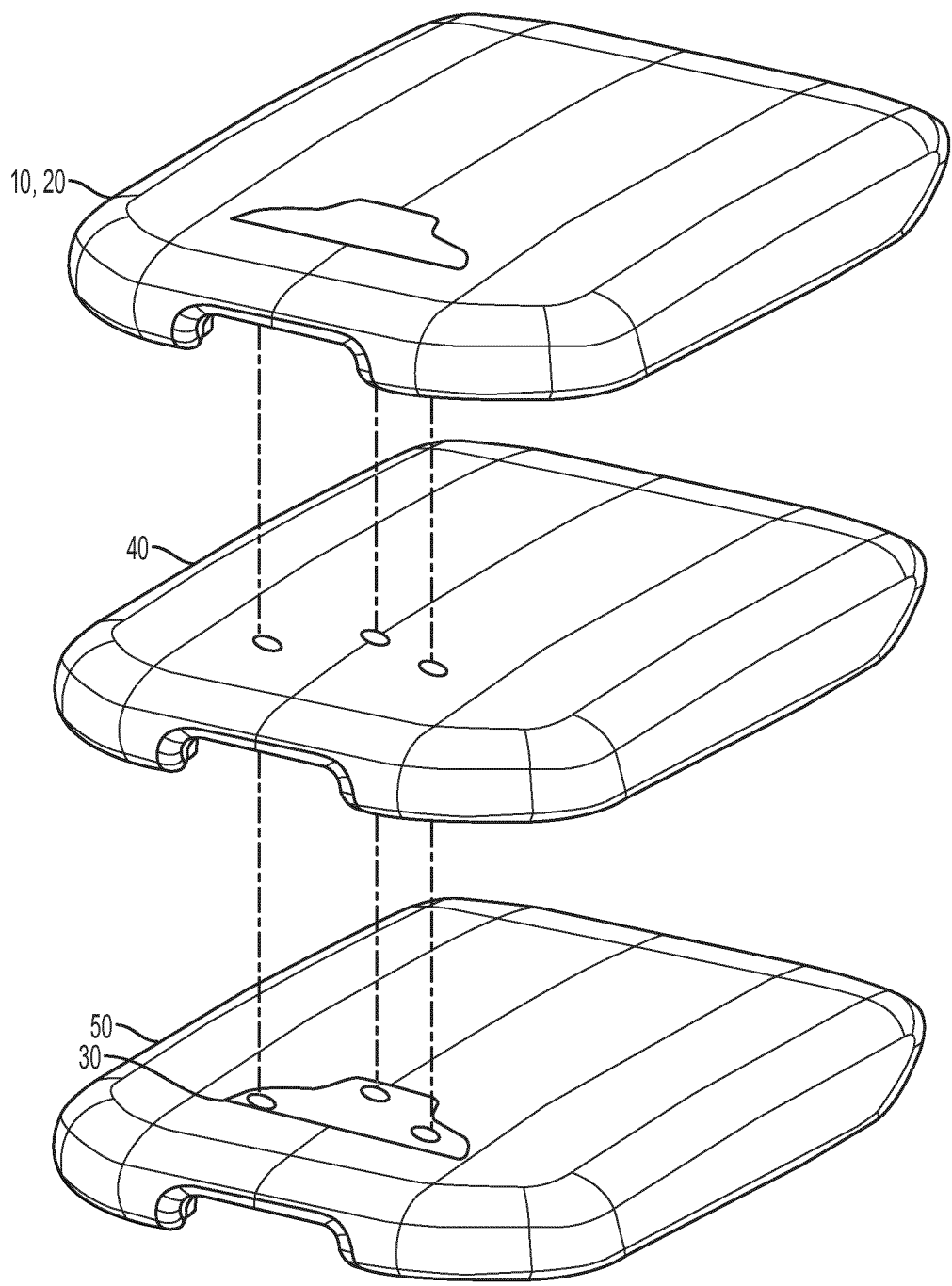
FIG. 3C is a perspective view of a portion of a vehicle console, according to the third exemplary embodiment.

FIG. 3C is a perspective view of a portion of a vehicle console, according to the third exemplary embodiment. Specifically, FIG. 3C depicts three perspective views (upper, middle and lower) indicating an exemplary and non-limiting order of assembly of a portion of a vehicle console in dashed lines. In more detail, the upper view corresponds to the skin assembly of the badge 10 and upper portion 20 described above and shown in FIG. 3A. The middle view depicts foam insert 40 with a plurality of apertures 44. The lower view depicts the back plate 30 assembled with the lid inner portion 50 as shown in FIG. 3B. As indicated by the dashed lines in FIG. 3C, the skin assembly is placed over the foam insert 40 and the assembly of the back plate 30 and lid inner portion 50.

Figure 3D:
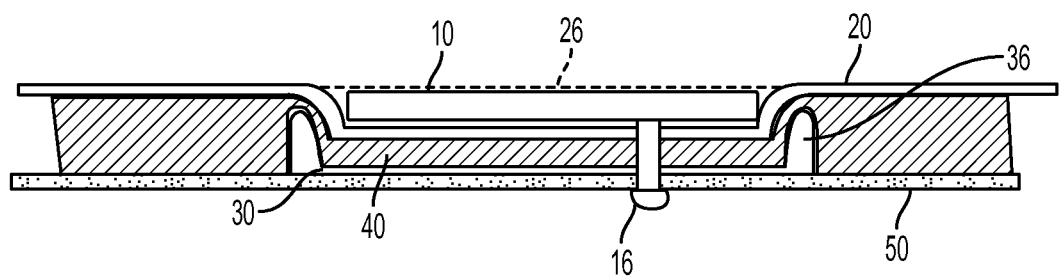
FIG. 3D is a partial cross-section of a portion of a vehicle console, according to the third exemplary embodiment.

FIG. 3D is a partial cross-section of a portion of a vehicle console, according to the third exemplary embodiment. In particular, FIG. 3D shows the badge 10 assembled with the upper portion 20 and placed over the insert 40 and the assembly of the back plate 30 and lid inner portion 50. As shown in FIG. 3D, at left and right sides of the badge 10, the back plate 30 may include projections 36 which extend from a base of the back plate 30 that is parallel to the lid inner portion 50, so as to rise perpendicular to the lid inner portion 50 (a lower layer) toward a surface 26 of the upper portion 20.

The projections 36 may be formed with a fillet radius corresponding to radius R1 of the soft material of upper portion 20. In some embodiments, the fillet radius of the projections 36 may be tighter than that of the soft material, such that the projections rise more steeply than the soft material at edges of the badge 10. The projections 36 may penetrate through the foam insert 40 so as to form peaks on either side of the badge 10, or the foam insert 40 may be provided with one or more cut-outs or receiving portions configured to accommodate the projections 36. The projections 36 may contribute to enhanced stabilization of the badge 10 and to preserving the styling radius R1 so as to achieve a crisp visual definition and separation of the badge 10 from the soft material. Further, as with the first and second exemplary embodiments, a solid attachment is established from the badge 10 to the lid inner portion 50, which serves as a base of attachment structure 100, via a guide 12 and attachment member 16, such as a heat stake or screw assembly.

Figure 4A:
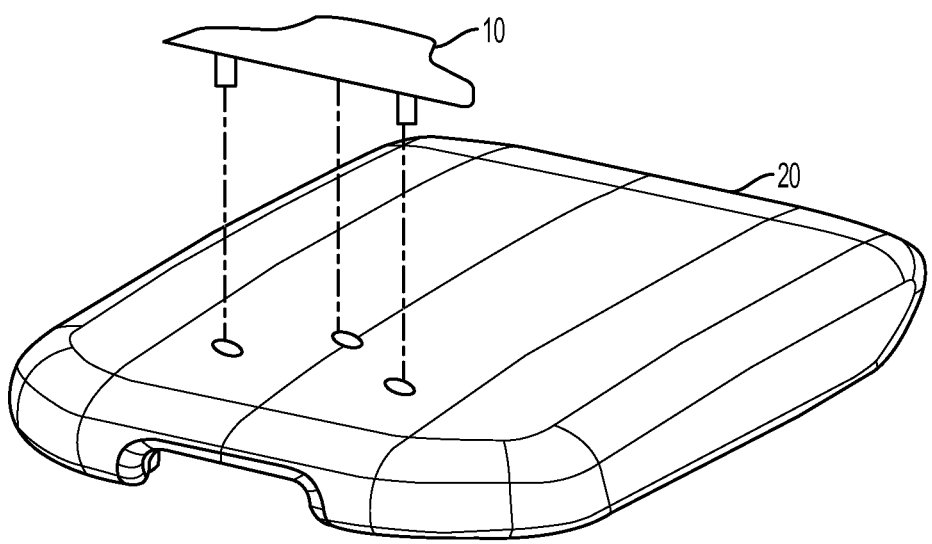
FIG. 4A is a perspective view of a portion of a vehicle console including a decorative badge, according to a fourth exemplary embodiment.

FIG. 4A is a perspective view of a portion of a vehicle console including a decorative badge, according to a fourth exemplary embodiment. The badge 10 and upper portion 20 of the soft material of the console lid may be structured and assembled in a similar or identical manner as described above with respect to the first, second and third exemplary embodiments. In particular, the badge 10 is front mounted through the upper portion 20 via locating elements such as the guides 12. The badge 10 mounted to the upper portion 20 forms a 'skin assembly' corresponding to an outer portion of a vehicle console lid (e.g., an upper skin layer over lid inner portion 50).

Figure 4B:
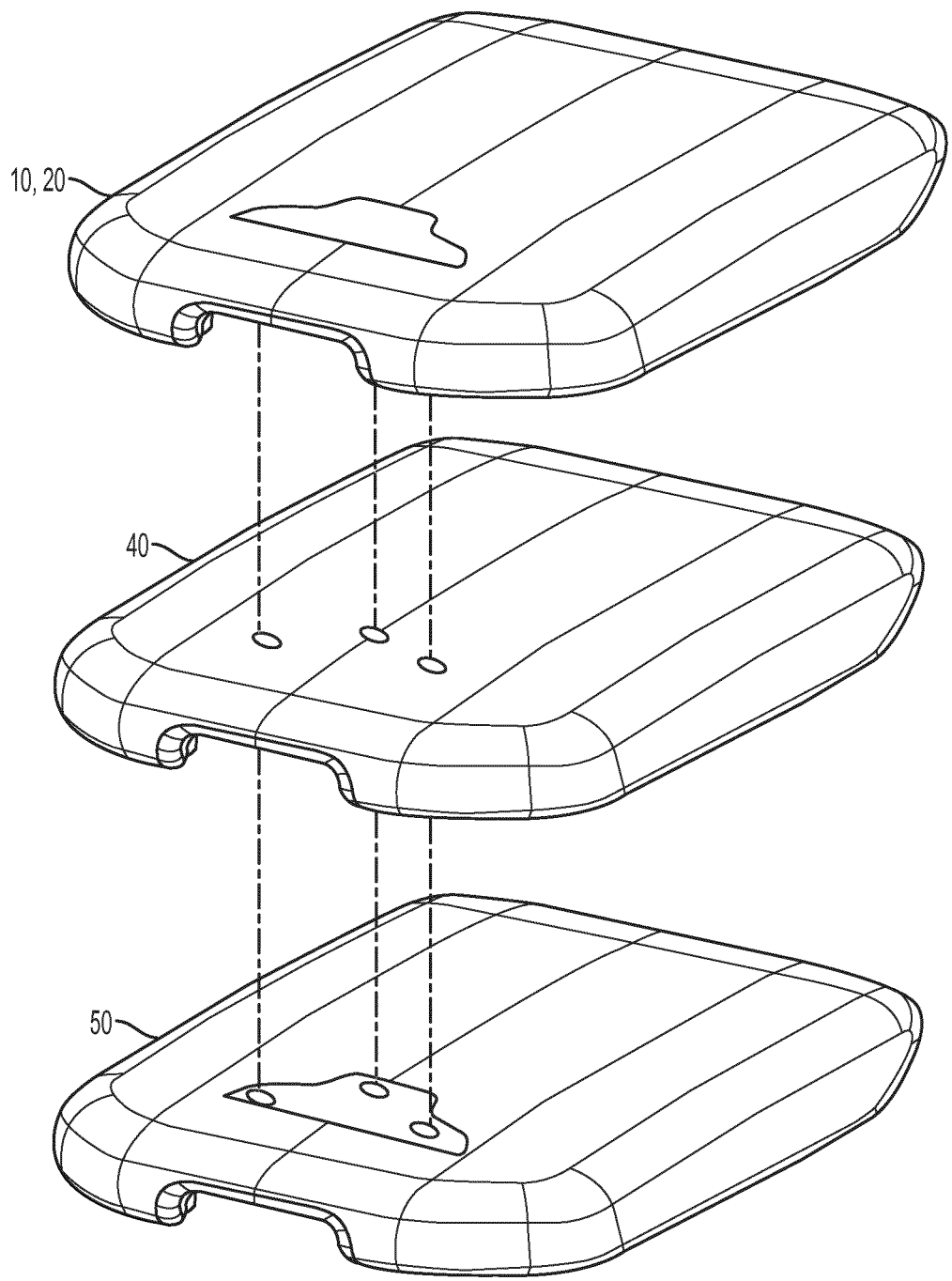
FIG. 4B is a perspective view of a portion of a vehicle console including a back plate, according to the fourth exemplary embodiment.

FIG. 4B is a perspective view of a portion of a vehicle console including a back plate, according to the fourth exemplary embodiment. More specifically, FIG. 4B depicts three perspective views (upper, middle and lower views) of portions of a vehicle console lid, with dashed lines indicating an exemplary and non-limiting order of assembly. The upper view corresponds to the skin assembly of the badge 10 and upper portion 20 described above and shown in FIG. 4A, for example. The middle view depicts a foam insert 40 with apertures 44. The apertures 44 may be formed to correspond to and communicate with apertures 22 in the upper portion 20 shown in FIG. 4A. Finally, the lower view depicts the lid inner portion 50 which is molded so as to correspond to features of the back plate 30. The skin assembly is placed over the foam insert 40 and the lid inner portion 50, with the apertures 22 of the upper portion 20 aligning with the apertures 44 of the foam insert 40 and the apertures 52 of the lid inner portion 50.

Figure 4C:
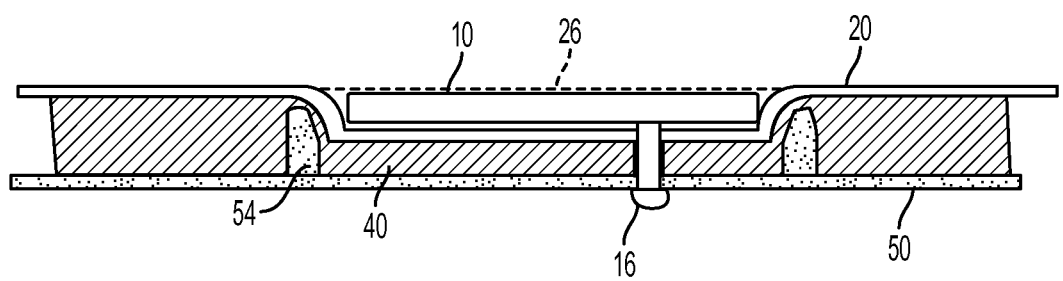
FIG. 4C is a partial cross-section of a portion of a vehicle console, according to the fourth exemplary embodiment.

FIG. 4C is a partial cross section of a portion of a vehicle console, according to the fourth exemplary embodiment, as taken along line A-A shown in FIG. 1C. The partial cross section shown in FIG. 4C depicts the lid inner portion 50 including one or more elements of the back plate 30. For example, the lid inner portion 50 may include apertures to communicate with the guides 12 in addition to projections 54. The projections 54 may be similar to the projections 36 described above in regard to FIG. 3D. For example, in some embodiments, the fillet radius of the projections 54 may be tighter (smaller) than that of the material of the upper portion 20 at the left and right sides of the badge 10, such that the projections rise more steeply than the soft material at edges of the badge 10. In some embodiments, the projections 54 are formed with a substantially linear portion at a distal end from the badge 10, and an include an inclined portion at a proximal end with respect to the badge 10. The angle of inclination of the inclined portion may exceed an angle of incidence of the fillet radius of arched portions of the foam insert and/or the material of the upper portion 20. In some embodiments, the proximal end may include a linear segment and a tapered portion that approximates the fillet radius of at least one of the foam insert 40 or the material of the upper portion 20.

In contrast to the projections 36 shown in FIG. 3D, the projections 54 shown in FIG. 4C are formed in the lid inner portion 50, and no separate back plate is provided. In other words, rather than providing a separate back plate 30 including its own projections 36, as in FIG. 3D, the lid inner portion 50 is provided with projections 54 which are shape-molded, as part of the lid inner structure. In this manner, the back plate 30 and the lid inner portion 50 (a base portion) are integrally formed. As with the first, second and third embodiments, a solid attachment is created by a heat stake or screw assembly, for example, from the badge 10 to the lid inner portion 50.

The installation structures and methods described above may be applied in a variety of implementations. For example, the above-mentioned installation structures and methods may be employed in order to install a decorative badge in a lid for a console in an automotive vehicle, a motorcycle, a scooter, a motorbike, a naval vessel or an aircraft. Further, the aforementioned techniques may be used to emplace a decorative badge in structures other than a console lid, e.g., a glove compartment, a panel, a seat back, and a steering wheel, for example. The foregoing examples are intended to be illustrative and not limiting of the implementations of the techniques described herein.

As may be utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to precise numerical ranges. Accordingly, these terms should be interpreted as indicating that insubstantial or inconsequential modifications or alterations of the subject matter described and claimed are considered to be within the scope of the inventions as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures of this application. It should be noted that the orientation of various elements may differ according to other exemplary embodiments, and that such variations are intended to be encompassed by the present disclosure.

The construction and arrangement of the elements of the decorative badges, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure.

It is to be understood that although the present invention has been described with regard to preferred embodiments thereof, various other embodiments and variants may occur to those skilled in the art, which are within the scope and spirit of the disclosure, and such other embodiments and variants are intended to be covered by corresponding claims. For example, any element (e.g., decorative badge, foam insert, etc.) disclosed in one embodiment may be incorporated or utilized with any other embodiment disclosed herein. Also, for example, the order or sequence of any process or method steps may be varied or re-sequenced according to alternative embodiments. Other substitutions, modifications, changes and omissions may be made in the design, operating configuration, and arrangement of the preferred and other exemplary embodiments without departing from the scope of the appended claims.

The invention claimed is:

1. An attachment structure, comprising:
an outer skin;
an ornament embedded in the outer skin;
a plate positioned on an underside of the outer skin such that the outer skin is disposed between the ornament and the plate;
a base disposed at an underside of the plate and configured to be coupled to the plate; and
a cushion positioned between the outer skin and the plate or between the plate and the base;
wherein the ornament is embedded in a recessed portion of an upper surface of the outer skin, and
wherein an upper surface of the plate is configured to directly contact the underside of the outer skin.

2. The attachment structure of claim 1, wherein:
the cushion is positioned between the outer skin and the plate;
the ornament and the plate are fixed to the base by one or more fasteners; and
the plate and the base are formed integrally with each other.

3. The attachment structure of claim 1, wherein the cushion is positioned between the plate and the base, and the cushion includes a recessed portion that is aligned in a horizontal direction with the recessed portion of the outer skin.

4. The attachment structure of claim 1, wherein:
the ornament is secured to the base by one or more bolts coupled to the base, and
the plate includes one or more apertures configured to receive the bolts.

5. The attachment structure of claim 1, wherein:
the ornament is fixed to the plate via at least one first fastener protruding downward from the ornament;
the outer skin includes at least one first opening configured to receive the at least one first fastener;
the plate includes at least one second opening configured to receive the at least one first fastener;
the at least one first fastener is configured to engage with the at least one first and second openings; and
the plate is fixed to the base via at least one second fastener protruding downward from the plate.

6. The attachment structure of claim 5, wherein:
the base includes at least one third opening configured to receive the at least one first fastener, and at least one fourth opening configured to receive the at least one second fastener; and
the at least one third and fourth openings are positioned on an upper surface of the base.

7. The attachment structure of claim 1, wherein the attachment structure is part of an arm rest of a center console.

8. An installation, comprising:
an upper skin layer;

an ornament embedded in an upper surface of the upper skin layer;

a lower layer configured to be coupled to a rear side of the upper skin layer, the lower layer comprising:

a base disposed parallel to the ornament and coupled to a plate, the plate being positioned such that the upper skin layer is disposed between the ornament and the plate; and a plurality of projections extending from the base toward the upper surface of the upper skin layer; and a cushion disposed between the ornament and the lower layer;

wherein the plurality of projections are configured to penetrate the cushion; and wherein the cushion is positioned between the plate and the base, and the cushion includes a recessed portion that is aligned in a horizontal direction with a recessed portion of the upper skin layer.

9. The installation of claim 8, wherein at least one fastener secures the ornament to the lower layer via an interference fit.

10. The installation of claim 8, wherein the ornament is positioned in the recessed portion of the upper skin layer, and the projections are disposed adjacent to end portions of the recess.

11. The installation of claim 8, wherein the recessed portion of the cushion is disposed beneath the recessed portion of the upper skin layer.

12. The installation of claim 8, wherein a fillet radius of the projections is smaller than a fillet radius of the upper skin layer between the projections and the ornament.

13. The installation of claim 8, wherein:

at least one of the plurality of projections includes an inclined portion;

the cushion includes at least one arched portion adjacent to a side of the ornament in the horizontal direction; and an angle of inclination of the inclined portion exceeds a fillet radius of the at least one arched portion.

* * * * *